United States Patent [19]

Gold

[11] 3,875,229

[45] Apr. 1, 1975

[54] SUBSTITUTED CARBOXANILIDES

[75] Inventor: Elijah H. Gold, West Orange, N.J.

[73] Assignee: Schering Corporation, Bloomfield, N.J.

[22] Filed: June 19, 1973

[21] Appl. No.: 371,452

Related U.S. Application Data

[63] Continuation-in-part of Ser. No. 309,539, Nov. 24, 1972, abandoned.

[52] U.S. Cl............ 260/562 R, 260/477, 260/490, 260/556 A, 260/556 AR, 260/557 R, 260/558 P, 260/559 B, 260/562 A, 260/562 B, 424/308, 424/311, 424/321, 424/324

[51] Int. Cl.......................................... C07c 103/32

[58] Field of Search....... 260/557, 562, 78, 79, 556, 260/490, 559, 477

[56] References Cited

UNITED STATES PATENTS

| | | | |
|---|---|---|---|
| 3,197,503 | 7/1965 | Smith et al............ | 260/562 |
| 3,211,544 | 10/1965 | Dubrovin............ | 260/557 |
| 3,277,171 | 10/1966 | Hopkins............ | 260/557 |
| 3,332,768 | 7/1967 | Freund et al......... | 260/562 |
| 3,407,056 | 10/1968 | Schwartz............ | 260/562 |
| 3,418,345 | 12/1968 | Baker............... | 260/562 |
| 3,426,049 | 2/1969 | Baker............... | 260/562 |
| 3,448,195 | 6/1969 | Kano et al.......... | 260/562 |
| 3,462,486 | 8/1969 | De Feo............. | 260/562 |
| 3,608,087 | 9/1971 | Patchett et al...... | 260/557 |
| 3,720,686 | 3/1973 | Narayanan et al... | 260/562 |
| 3,723,442 | 3/1973 | Nakanishi et al... | 260/562 |

FOREIGN PATENTS OR APPLICATIONS

| | | | |
|---|---|---|---|
| 4,520,516 | 7/1970 | Japan................. | 260/562 |
| 4,115,717 | 9/1966 | Japan................. | 260/562 |

OTHER PUBLICATIONS

Shapiro et al., J. Am. Chem. Soc., Vol. 81, pp. 6322–6329, (1959).

Bittner et al., J. Am. Chem. Soc., Vol. 92, pp. 5001–5003 (1970).

*Primary Examiner*—Harry I. Moatz
*Attorney, Agent, or Firm*—Stephen B. Coan; Raymond A. McDonald

[57] ABSTRACT

This application relates to substituted carboxanilides, to methods for their preparation and to methods for their use as anti-androgenic agents.

2 Claims, No Drawings

SUBSTITUTED CARBOXANILIDES

This application is a continuation-in-part of my copending application Ser. No. 309,539 filed Nov. 24, 1972, now abandoned.

This invention relates to valuable therapeutically active chemical compounds belonging to the general class of substituted anilides and to the processes for making such compounds as well as to the processes for using them as therapeutically effective anti-androgenic agents.

The chemical compounds of this invention are more specifically described as substituted anilides of the structural formula:

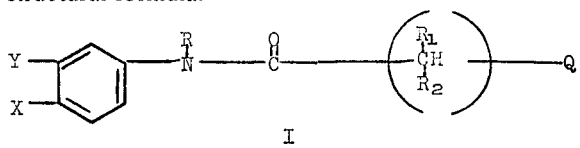

I wherein X is a member of the group consisting of nitro, trifluoromethyl, chloro, bromo and iodo; Y is a member of the group consisting of hydrogen, halogen, nitro, amino, lower alkylamino, lower dialkylamino, lower alkyl, lower alkoxy, lower alkanoyl, polyfluorolower alkoxy, polyfluoroloweralkyl, polyfluoroalkylthio and

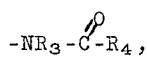

$NR_3SO_2R_4$; R is hydrogen or an alkyl having less than five carbon atoms; $R_1$ and $R_2$ each are straight or branched alkyl radicals having up to eight carbon atoms, cyclopropyl, or cyclobutyl, and together with the carbon atom to which they are attached, $R_1$ and $R_2$ form cyclopropyl and cyclobutyl, $R_3$ is hydrogen or lower alkyl and $R_4$ is hydrogen, lower alkyl, arylalkyl or aryl and Q is a member of the group consisting of halogen, hydroxy, lower alkoxy, lower arylalkoxy, lower alkanoyloxy and lower arylalkanoyloxy.

As used herein, the term "lower" when used to modify such terms as "alkyl," "alkoxy," "alkanoyl," "alkanoyloxy," is meant to include those radicals having up to and including six carbon atoms. In such instances it is preferred that such radicals contain less than four carbon atoms. The term "polyfluoro" includes those groups wherein at least two hydrogen atoms have been replaced by fluorine, and include partially fluorinated (e.g., difluoromethyl) and perfluoro (e.g., trifluoromethyl) radicals. The term "branched chain" alkyl group means those monovalent alkyl groups having one or two carbon atoms of the alkyl radical having lower alkyl substituents. Although Q may be attached to any of the carbon atoms of the moiety

(as defined), it is preferred that such Q substituent be attached to that carbon atom directly attached to the carbonyl function. For clarity and simplicity of expression, in the reaction schemes set forth hereinbelow, the moiety

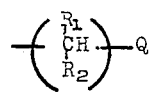

will be replaced by Z.

In the preparation of the substituted carboxanilides of formula I, a variety of methods are available, depending upon, of course, the reactants available at hand and/or the type substituent (primarily the Q substituent) one desires the final compound to possess. Exemplifying processes are described below:

a. In general, the substituted carboxanilides of formula I can be prepared by acylation of the corresponding X,Y-substituted aniline with the acid of the formula Z.CO.OH or with an amide-forming derivative thereof.

When Q represents halogen, lower alkoxy, lower arylalkoxy, lower alkanoyloxy or lower arylalkanoyloxy, it is preferred to acylate the X,Y-substituted aniline with an amide-forming derivative of the acid, preferably the halide or anhydride or equivalenty functioning derivative such as a trisubstituted acyloxyphosphonium halide or orthoester. For example, an X,Y-substituted carboxanilide, wherein Q represents halogen (bromine, chlorine, fluorine, iodine), lower alkoxy, lower arylalkoxy, lower alkanoyloxy or lower arylalkanoyloxy, can be prepared by the condensation of an appropriately X,Y-substituted aniline with an acyl halide (preferably the chloride or bromide) bearing the halogeno, lower alkoxy, arylalkoxy, alkanoyloxy, or arylalkanoyloxy moiety thereon. The condensation is effected by heating a mixture of the reactants with or without an acid acceptor. Preferably the condensation takes place in a solvent at elevated temperatures, up to about the reflux temperature of the reaction mixture. Suitable solvents include commonly used condensation organic solvents such as benzene, xylene, diethylether, pyridine and triethylamine. Suitable acid acceptors include triethylamine, pyridine, and basic alkali metal salts such as sodium and potassium bicarbonates. If desired, the reaction solvent itself may serve as the acid acceptor, as when pyridine and triethylamine solvents are employed. The condensation proceeds rapidly and at the completion thereof the reaction mixture is admixed either with water or with a dilute mineral acid and cooled. The desired product is then removed from the aqueous mixture by extraction with waterimmiscible solvents such as diethyl ether, toluene, chloroform, ethyl acetate and the like. After appropriate water-washings, the product is isolated by evaporation of the solvent, and the product then further purified by the usual techniques, such as by recrystallization.

The foregoing reaction may be depicted by the following structural representation:

Reaction Scheme A:

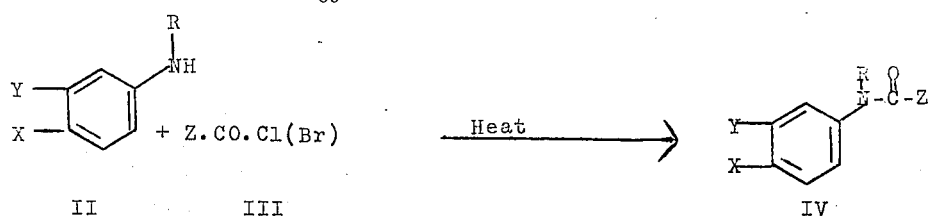

wherein X, Y, R and Z are as previously defined (Q not being hydroxy).

Those compounds of formula I wherein Q represents hydroxy may be prepared by condensation of the appropriately X,Y-substituted aniline (II) with an hydroxylated acid Z.COOH or ester thereof by heating such reactants neat or in a suitable solvent. The isolation and purification of the desired product is then effected as previously described for Reaction Scheme A. This condensation may be depicted by the following structural representation:

Reaction Scheme B:

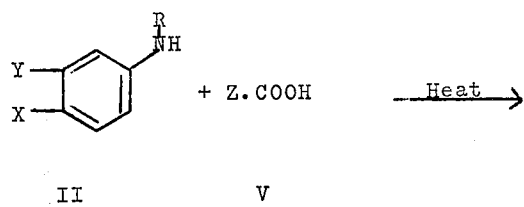

wherein X, Y, R and Z are as previously defined (Q being hydroxy). Quite naturally, compounds of formula VI may be converted to the corresponding alkanoyl or arylalkanoyl esters (i.e., those compounds of formula I wherein Q represents alkanoyloxy or arylalkanoyloxy) by reaction of VI with the appropropriate acid anhydride according to standard esterification techniques well known in the art, and once the alkanoyloxy compound is obtained, it quite naturally may be hydrolyzed back to alcohol. When Q represents lower alkoxy or arylalkoxy, the aniline reactant (II) may be condensed with an acid or ester thereof as well as with an acyl halide as described for Reaction Scheme B.

b. Hydrolysis of an imidohalide or of an ester of an N-phenyl imidic acid of the formula

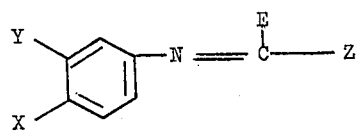

wherein X, Y and Z are as defined above and E. represents an appropriate leaving group such as a halogen atom, preferably chlorine or bromine, or an alkoxy group, etc., by means of an alkali, e.g., a dilute alkali metal hydroxide. The product is a carboxanilide of the formula I wherein R represents hydrogen.

c. Beckman rearrangement of an oxime or O-acyl derivative thereof or of the corresponding hydrazones or semicarbazones of the formula

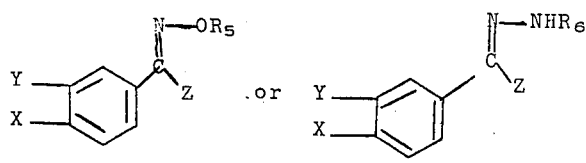

wherein X, Y and Z are as defined above, and $R_5$ is hydrogen or an acyl group, e.g. acetyl, methanesulfonyl, or toluene-p-sulfonyl, and $R_6$ represents a hydrocarbon radical or the group —CO—$NH_2$. This process yields carboxanilides of the formula I in which R is hydrogen.

The oximes or O-acyl derivatives may be obtained by reacting the corresponding ketone with hydroxylamine or the O-acyl derivative thereof.

d. Schmidt reaction between a ketone of the formula

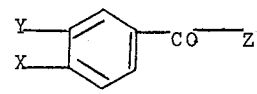

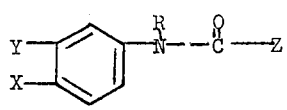

wherein X, Y and Z are as defined above, and a substantially equimolar quantity of hydrazoic acid in the presence of a strong acid, and isolation of the desired product of the formula I. (The isomeric amide of the formula

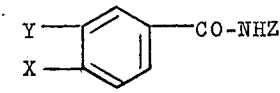

wherein X, Y and Z are as defined above, is a probable byproduct in this reaction). This process yields carboxanilides of the formula I in which R is hydrogen. This process is not recommended for preparing those compounds wherein Q is a lower alkanoyloxy or lower arylalkanoyloxy group.

e. Passerini-type reaction between an X,Y-substituted phenyl isocyanide, a ketone $R_1.CO.R_2$, and either an acid QH (where Q is a lower alkanoyloxy group or a lower arylalkanoyloxy group) or a mineral acid. When the acid has the formula QH, the lower alkanoyloxy or lower arylalkanoyloxy group represented by Q is introduced into the carboxanilide of formula I; when the acid is a mineral acid, e.g., sulfuric, hydrochloric, hydrobromic, nitric or phosphoric, the group Q in the resulting carboxanilide of formula I is hydroxy. This reaction yields carboxanilides of the formula I in which R is hydrogen and Q is a substituent on the α-carbon atom of the group Z.

The acid and isocyanide are preferably used in substantially equimolar quantities. A solvent, preferably aprotic, for example an excess of the ketone $R_1.CO.R_2$, may if desired be used. The reaction is preferably carried out at moderate or low temperatures, e.g., −10° to +40°C. After completion of the reaction, the resulting carboxanilide may be isolated by standard methods, e.g., by pouring the reaction mixture into water or dilute aqueous alkali (e.g., sodium carbonate or bicarbonate), and filtering off the precipitate.

The reaction may be illustrated by one of the following schemes:

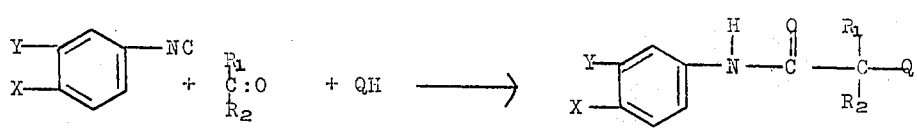

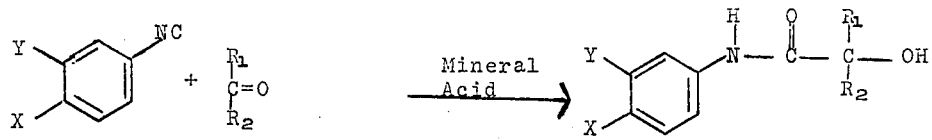

f. Reductive acylation of a nitrobenzene derivative of the formula IIA

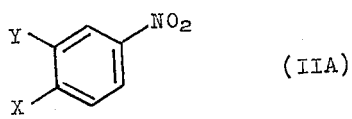

wherein X and Y are as defined above (except nitro), by means of ZCOOH or a reactive derivative thereof, e.g., the anhydride, in the presence of a reducing metal, e.g., zinc. This process yields carboxanilides of the formula I in which R is hydrogen.

g. Oxidation of a compound of one of the following formulae:

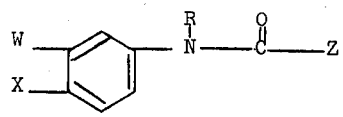 and 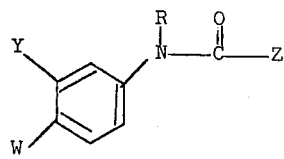

wherein X, Y, R and Z are as defined above, and W represents —NH$_2$, —NHOH or —NO. When W is —NHOH or —NH$_2$, the oxidation is preferably effected by means of a peroxide, e.g. hydrogen peroxide or persulfuric acid, whereas other oxidizing agents such as permanganates and nitric acid can be used when W is —NO. The process yields carboxanilides of the formula I in which X or Y is nitro.

This process is not recommended for the preparation of compounds in which Q is a hydroxy group.

h. The hydroxylation may also be effected by enzymatic action or by microbiological hydroxylation techniques.

i. Metabolic hydroxylation of an anilide of the formula

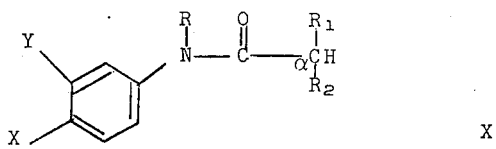

wherein X, Y, R, R$_1$, and R$_2$ are as defined above. The compound of the formula X is fed to animals capable of hydroxylating it on the α-carbon atom, and the resulting hydroxylated carboxanilide of formula I is isolated from the urine by extraction thereof with a water-immiscible solvent such as ethyl acetate, benzene, ether or methylene chloride. The animals may conveniently be small laboratory animals such as rats or mice, but larger animals such as cattle and pigs may also be used.

This process yields carboxanilides of formula I wherein Q is a hydroxy group on the α-carbon atom.

j. Amide exchange reaction wherein an anilide, the acyl moiety of which differs from the desired —CO—Z group, is reacted with the appropriate acid ZCOOH under conditions favoring formation of the carboxanilide of the formula I, e.g., by refluxing with a large excess of the acid ZCOOH, or under reaction conditions designed to remove the acid moiety of the starting anilide from the reaction mixture:

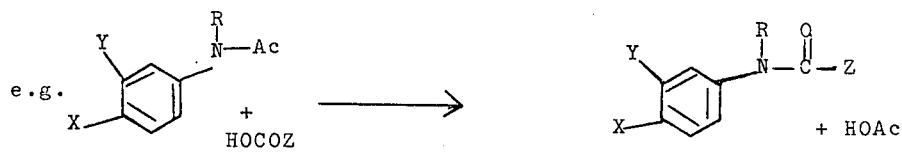

wherein X, Y, R and Z are as defined above, and Ac is an acyl group differing from the desired —CO—Z group. The starting anilide can be chosen to yield an acid AcOH which is removed from the reaction mixture and so favor formation of the desired anilide. A volatile acid AcOH (such as acetic or formic acid) can be distilled out of the reaction mixture.

This process is not recommended when Q is a lower alkanoyloxy or a lower arylalkanoyloxy group.

k. Isomerisation of an N-halo-anilide of the formula

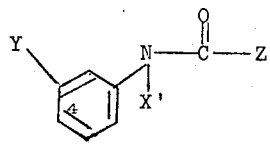

wherein Y and R are as defined above, and X' is a halogen atom, preferably chlorine or bromine, or a nitroso group, by heating (e.g. to 100°–300°C.) or by photolysis, optionally in the presence of HX', whereby the group X' migrates to the 4-position (Orton type rearrangement). This process yields carboxanilides of the formula I wherein R is hydrogen and X is halogen or nitro, the nitroso group being cocommitantly oxidized by a suitable oxidizing agent, e.g. oxygen. Alternatively, the N-halo-anilide may be heated in the presence of HX'', where X'' is a halogen atom of lower electronegativity than X', whereby X'' substitutes the benzene ring at the 4-position.

*l.* Elimination of a substituent W' from the benzene ring of a compound of the formula

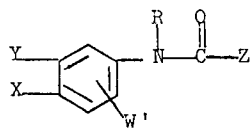

wherein X, Y, R and Z are as hereinbefore defined. W' is preferably an —NH₂ groups, which is eliminated by diazotization and reduction under standard conditions. Reduction can be effected for example with alcohol, with hypophosphorous acid, or with formaldehyde under alkaline conditions.

*m.* Introduction of a substituent X into a compound of the formula

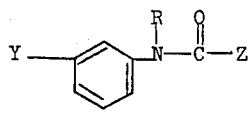

wherein R, Y and Z are as hereinbefore defined, especially when X is bromine, iodine or preferably nitro, by standard methods of halogenation or nitration.

The compounds of formula I obtained by any appropriate process described above may be subjected to one or more of the following after-treatments:

*i.* Removal of a protecting group Pg from a compound of the formula

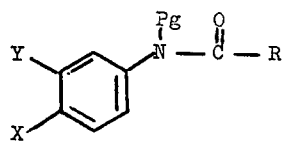

wherein X, Y and R are as defined above. The protecting group Pg is preferably one which can be removed by hydrogenolysis, e.g. a benzyl group.

This process yields carboxanilides of the formula I wherein R is a hydrogen atom, and is not applicable when X is NO₂.

The nitrogen atom may carry such a protecting group Pg in any of the foregoing processes (*a*), (*g*), (*h*), (*j*), (*l*) and (*m*).

*ii.* N-Alkylation of a compound of formula I, wherein R represents hydrogen. The alkylation reaction is preferably carried out by reacting the anilide with a compound containing the alkyl group and a reactive moiety, preferably an organic or inorganic ester group.

*iii.* Acylation of a compound wherein Q = OH to yield a compound wherein Q = lower alkanoyloxy or lower arylalkanoyloxy, by means of a reactive derivative of the acid QH, preferably the anhydride or a halide such as the chloride or bromide.

*iv.* Hydrolysis of a compound wherein Q = lower alkanoyloxy or lower arylalkanoyloxy to yield a compound wherein Q = OH, preferably be means of an equivalent amount or small excess of dilute alkali such as alcoholic sodium or potassium hydroxide at moderate temperature, preferably ambient temperature.

*v.* Formation of a pharmaceutically acceptable salt of compounds of formula I capable of salt-formation.

In those instances wherein the required X, Y, R aniline reactants are not per se known, then such reactants may be prepared according to skills well known in the art. For example, in those instances wherein the Y-substituents is a polyfluorolower alkyl radical (other than a perfluoro radical) such as difluoromethyl or α,α-difluoroethyl, the compound bearing such substituent may be prepared by heating m-nitrobenzaldehyde or m-nitroacetophenone with sulfur tetrafluoride under pressure to form the corresponding difluoro compound. Hydrogenation of the nitro group affords the m-substituted aniline which may be acylated as described above. The X-substituents (i.e., the nitro, trifluoromethyl, chloro, bromo and iodo substituents) may be prepared by aromatic substitution reactions known to the art. Where the desired R-group of the foregoing substituted anilides is other than hydrogen, it may be prepared by subjecting the substituted aniline or anilide to standard alkylation procedures.

In addition to the above-mentioned specific processes it is also possible to prepare compounds of formula I wherein Q represents —OH by hydrolizing compounds of the formula

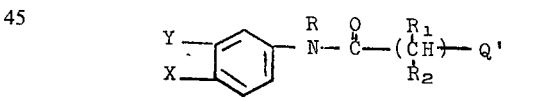

wherein X, Y, R₁ and R₂ are as previously defined, and Q' represents

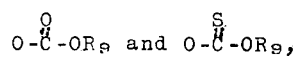

or in each instance "OR₉," together with the remaining portion of the molecule may represent a symmetrical or a non-symmetrical dimer (e.g.)

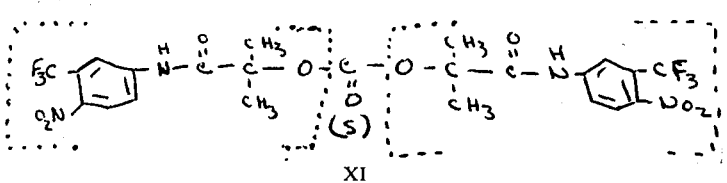

wherein $R_9$ represents alkyl, aryl or aralkyl; non-symmetrical dimers being those compounds wherein the enclosed dotted moieties are different in any of their X, Y, R, $R_1$ and $R_2$ moieties.

The foregoing compounds XI are readily prepared by standard procedures such as by reacting the appropriate anilide wherein Q represents OH with the appropriate carbamoyl chloride or thiocarbamoylchloride. These compounds also are useful as anti androgenic agents as described for those compounds of formula I.

The preparation of the compounds of formula I is illustrated by the following specific examples.

EXAMPLE 1

2-Bromo-4'-nitro-3'-trifluoromethylisobutyranalide

Reflux for 18 hours a mixture of 10.0 g. (0.0485 moles) of 4-nitro-3-trifluoromethylaniline, 12.1 g. (0.055 mole) of 2-bromoisobutyryl bromide and 100 ml. of dry benzene. Cool, filter off any insoluble materials, wash the filtrate with water and then with sodium bicarbonate solution and dry over magnesium sulfate. Remove the solvent, and obtain the crude product of this example, which may be purified by chromatography on silica gel, m.p. 108°–120° (apparently due to at least two crystalline forms).

In a similar manner, prepare the 2-methoxy, 2-fluoro-2-chloro and 2-iodo-4'-nitro-3'-trifluoromethylisobutyranilides from 4-nitro-3-trifluoromethylaniline and the corresponding 2-methoxy or 2-halo-isobutyryl chloride or bromide. Similarly by starting with the N-alkylated derivatives of the 4-nitro-3-trifluoromethylaniline reactant, e.g., N-methyl-4-nitro-3-trifluoromethylaniline, N-ethyl-4-nitro-3-trifluoromethylaniline, N-propyl-4-nitro-3-trifluoromethylaniline, N-butyl-4-nitro-3-trifluoromethylaniline, and by substantially following the procedure of this example, there is produced N-methyl-2-bromo-4'-nitro-3'-trifluoromethylisobutyranilide, N-ethyl-2-bromo-4'-nitro-3'-trifluoromethylisobutyranilide, N-propyl-2-bromo-4'-nitro-3'-trifluoromethylisobutyranilide, N-butyl-2-bromo-4'-nitro-3'-trifluoromethylisobutyranilide, respectively.

EXAMPLE 2

2-Hydroxy-4'-nitro-3'-trifluoromethylisobutyranilide

In a nitrogen atmosphere, heat at 180°C, for 18 hours, a mixture of 25 g. (0.125 moles) of 4-nitro-3-trifluoromethyl aniline and 65 g. (0.625 moles) of 2-hydroxyisobutyric acid. Cool, dissolve the mixture in ether, wash with water, sodium carbonate and then water again and dry over sodium sulfate. Filter, remove the solvent and obtain the crude product of this example, m.p. 152°–153.5°C after crystallization from a benzene-methanol mixture.

Similarly, by substituting either the 4-nitro-3-trifluoromethylaniline or the 2-hydroxyisobutyric acid reactant and by substantially following the procedure set forth in this example there is prepared 3',4'-dinitro-2-hydroxyisovaleranilide, 4'-chloro-2-hydroxy-3'-trifluoromethylcyclobutylcarbanilide, 3'-chloro-2-hydroxy-4'-iodocyclopropylcarbanilide, 3'-bromo-2-hydroxy-3-methyl-4'-nitrovaleranilide, 2-hydroxy-3'-iodo-4'-trifluoromethylisobutyranilide, 2,3-dimethyl-2-hydroxy-3'-methyl-4'-nitrovaleranilide, 3'-acetyl-2,3-dimethyl-2-hydroxy-4'-iodovaleranilide, 3'-acetyl-2,3-dimethyl-2-hydroxy-4'-nitrovaleranilide, 2-hydroxy-3'-methoxy-4'-nitroisobutyranilide, 3'-ethyl-2-hydroxy-4'-trifluoromethylisobutyranilide, 2,3-dimethyl-2-hydroxy-4'-nitro-3'-trifluoromethylthiovaleranilide, 4'-chloro-2-hydroxy-3'propylisobutyranilide, 3'-bromo-2,3-dimethyl-2-hydroxy-4'-trifluoromethylcyclopropylcarbanilide, 2-hydroxy-4'-nitrobutyranilide, 2-hydroxy-3'-nitro-4'-bromoisobutyranilide, 4'-chloro-2-hydroxy-3'-iodoisovaleranilide, 2-bromo-4'-nitrocyclopropylcarbanilide, 2,3-dimethyl-2-hydroxy-3'-propionyl-4'-trifluoromethylbutyranilide, 2,3-dimethyl-2-hydroxy-3'-propionyl-4'-nitrobutyranilide, 2-hydroxy-4'-trifluoromethylisobutyranilide, 2-hydroxy-4'-nitro-3'-trifluoromethylisovaleranilide, 2-hydroxy-2-methyl-4'-nitro-3'-trifluoromethylbutyranilide, 2-hydroxy-3', 4'-dichloroisobutyranilide, 2-hydroxy-3', 4'-diiodoisobutyranilide, 3'-fluoro-2-hydroxy-4'-nitroisobutyranilide, 2-hydroxy-4'-chloro-3'-trifluoromethylisobutyranilide, 2-hydroxy-4'-nitroisobutyranilide, 2-ethyl-2-hydroxy-4'-nitro-3'-trifluoromethylbutyranilide, 3'-bromo-2-hydroxy-4'-nitroisobutyranilide, 2,3-dimethyl-2-hydroxy-4'-nitro-3'-trifluoromethylbutyranilide, 2-hydroxy-N-methyl-4'-nitro-3'-trifluoromethylisobutyranilide, 4'-chloro-2-hydroxy-N-methyl-3'-trifluoromethylisobutyranilide, 4'-bromo-2-hydroxy-3'-trifluoromethylisobutyranilide.

In those instances wherein it is desired to prepare an X, Y-disubstituted anilide which is not specifically shown herein, such compound may be prepared by analogy processes known in the art.

EXAMPLE 3

2,3-Dimethyl-2-hydroxy-4'-nitro-3'-trifluoromethylbutyranilide

Prepare the product of this example in the same manner as in previous example, substituting 82.5 g. (0.625 moles) of 2,3-dimethyl-2-hydroxybutyric acid for 2-hydroxyisobutyric acid.

2-Hydroxy-N-methyl-4'-nitro-3'-trifluoromethylisobutyranilide

Prepare the product of this example, in the same manner as in the previous example (2), substituting 27.5 g. (0.125 moles) of N-methyl-4-nitro-3-trifluoromethylaniline for 4-nitro-3-trifluoromethylaniline.

EXAMPLE 4

2-Acetoxy-4'-nitro-3'-trifluoromethylisobutyranilide

Dissolve 10.0 g. (0.034 moles) of 2-hydroxy-4'-nitro-3'-trifluoromethylisobutyranilide in a solution of 45 ml. of acetic anhydride and 5 ml. of concentrated hydrochloric acid and allow the mixture to stand at room temperature for 4 hours. Pour the resulting solution into water, extract with ether, neutralize the ether extract by washing with saturated sodium carbonate and water-wash the neutralized extract. Dry the extract over magnesium sulfate, filter, evaporate, triturate with hexane, and obtain the product of this example. Recrysallize from benzene-hexane and obtain analytically pure material m.p. 95.5°–96.5°C. Similarly, those compounds listed after example 2, may also be converted to the corresponding alkanoyloxy, and arylalkanoyloxy derivatives by the use of the appropriate acid anhydride.

EXAMPLE 5

2-Methoxy-4'-nitro-3'-trifluoromethylisobutyranilide

Heat a mixture of 28.3 g. (0.240 moles) of 2-methoxy-isobutyric acid and 10.0 g. (0.0485 moles) of 4-nitro-3-trifluoromethylaniline at 180°C for 20 hours. Cool and pour the resulting mixture into ether. Wash the ether extract successively with saturated sodium carbonate solution and water, dry the extract over magnesium sulfate, filter evaporate, triturate with isopropyl ether and obtain the product of this example. Recrystallize from isopropyl ether and obtain analytically pure material, m.p. 128°–129.5°C.

EXAMPLE 6

2-Valeryloxy-4'-nitro-3'-trifluoromethylisobutyranilide

To a stirred, cooled solution of 100 g. (0.485 mole) of 4-nitro-3-trifluoromethylaniline in 400 ml. of pyridine, slowly and in a dropwise fashion, add 109 gm. (0.53 mole) of 2-methyl-2-valeryloxypropionyl chloride and then heat the reaction mixture on a steam bath for 1.5 hours. Cool and pour the resulting mixture into ice-water, filter off and water-wash the crude anilide, and recrystallize the product of this example from isopropyl ether to obtain analytically pure material, m.p. 92.5°–94.0°.

EXAMPLE 7

2-Hydroxy-3'-bromo-4'-nitroisobutyranilide

To a solution of 32.9 g. (0.1 mole) of 2-acetoxy-3'-bromo-4'-nitroisobutyranilide in 500 ml. of ethanol, add 5.6 g. (0.1 mole) of potassium hydroxide maintaining the reaction at room temperature. Stir for several hours (until there is no evidence of starting ester by thin layer chromatography). Remove the solvent in vacuo, partition the residue between ether and water, dry the ether extract over sodium sulfate, filter, remove the solvent, and recrystallize the crude anilide from benzene to obtain analytically pure material, m.p. = 120.5°–121.5°.

EXAMPLE 8

2-Hydroxy-4'-bromo-3'-trifluoromethylisobutyranilide

Add 26.2 g. (0.1 mole) of 4-bromo-3-trifluoromethylphenylisocyanide to 250 ml. of acetone at −5°C. with stirring, followed by the dropwise addition of 10 ml. (0.12 mole) of concentrated hydrochloric acid, maintaining the temperature at −5°C. throughout the addition. After addition is complete, stir for 1 hour, allowing the temperature to rise by removing the external cooling system. Pour into 2 litres of 5% aqueous sodium bicarbonate and filter off the product of this example.

EXAMPLE 9

2-Acetoxy-4'-bromo-3'-trifluoromethylisobutyranilide

Add 26.2 g. (0.1 mole) of 4-bromo-3-trifluoromethylphenylisocyanide to a mixture of 6.6 g. (0.11 mole) of acetic acid and 9.2 g. (0.2 mole) of acetone and stir for 4 days. Pour into 200 ml. of water, and filter off and isolate the product of this example.

EXAMPLE 10

3'-Bromo-2-chloro-4'-nitroisobutyranilide

Prepare a diazotizing solution by slowly adding 37.3 g. (0.54 mole) of sodium nitrite to an ice-cold mixture of one litre of concentrated sulfuric acid and 500 ml. of water. To this solution at −5°C., add 238 g. (1.8 mole) of cold 50% hypophosphorous acid. To the stirred resulting mixture, slowly add a solution of 67.6 g. (0.2 mole) of 3'-amino-5'-bromo-2-chloro-4'-nitroisobutyranilide in 1.85 liters of acetic acid, maintaining the temperature at −10° to −15°C. After addition is complete, stir for two hours at this temperature and then allow the temperature to rise to 5°C and maintain this temperature for 36 hours. Pour into ice-water and obtain the product of this example.

EXAMPLE 11

2-Bromo-4'-nitro-3'-trifluoromethylisobutyranilide

Dissolve 6.1 g. of 2-bromo-3'-trifluoromethylisobutyranilide in about 40 ml. of sulfuric acid and cool to about 5°C. Add dropwise about 2.1 g. of 90% nitric acid dissolved in about 5.0 ml. of concentrated sulfuric acid. Permit the reaction to continue for 2 hours and pour into 500 ml. of ice water with agitation. Collect the product by filtration, wash it with water until free of excess acid, and obtain thereby the product of this example.

EXAMPLE 12

N-Methyl-2-methoxy-4'-nitro-3'-trifluoromethylisobutyranilide

At 20°C add 5.1 ml. (0.2 mole) of 90% hydrogen peroxide to 40 ml. of trifluoroacetic acid. To this solution add 14.5 g. (0.05 mole) of N-Methyl-4'-amino-2-methoxy-3'-trifluoromethylisobutyranilide in one portion. Maintain the temperature at about 50°C for 1 hour, pour the mixture into ice-water and obtain the product of this example.

EXAMPLE 13

4'-Bromo-2-chloro-3'-trifluoromethylisobutyranilide

Heat 10.0 g. (0.034 mole) of 4'-bromo-2-chloro-3'-trifluoromethylisobutyrophenone oxime in 350 g. of polyphosphoric acid at 130°–140°C. for 10 minutes. Pour the mixture into ice-water and obtain the product of this example.

EXAMPLE 14

2-Chloro-4'-iodo-3'-trifluoromethylisobutyranilide

Stir a mixture of 38.9 g. (0.10 mole) of 2-chloro-4'-iodo-3'-trifluoromethylisobutyrophenone, 150 ml. of benzene and 30 ml. of concentrated sulfuric acid at 40°–50°C and slowly add a 5% solution of hydrazoic acid (0.15 mole) in benzene. When the reaction ceases, pour the sulfuric acid layer into ice-water, neutralize with ammonia and obtain the product of this example.

EXAMPLE 15

2-Acetoxy-4'-bromo-3'-trifluoromethylisobutyranilide

Heat, on a steam bath for 30 minutes, a mixture of 16.5 g. of N-bromo-2-acetoxy-3'-trifluoromethylisobutyranilide in 50 g. of 36% hydrogen bromide in acetic acid. Pour into 250 ml. of ice-water and obtain the product of this example.

EXAMPLE 16

3'-Chloro-2-hydroxy-4'-nitroisobutyranilide

Heat a mixture of 21.5 g. (0.1 mole) of 3'-chloro-4'-nitroacetanilide and 1,040 g. (10 moles) of 2-hydroxyisobutyric acid for 24 hours at 180°–200°C., allowing the acetic acid to distil out as it is formed. Cool, partition between 10% aqueous sodium bicarbonate and ether, dry the neutral ether layer over magnesium sulfate, filter and obtain the product of this example after removal of the ether solvent.

EXAMPLE 17

4'-Bromo-2-methoxy-3'-trifluoromethylisobutyranilide

Add 22 g. of zinc dust in small portions to a stirred solution of 33 g. (0.12 mole) of 2-bromo-5-nitrobenzotrifluoride in 200 ml. of 2-methoxyisobutyric acid and 60 ml. of 2-methoxy-isobutyric anhydride at 0°C. Stir for 1 hour at 0°C., followed by 3 hours at room temperature and then heat to about 70°C for 15 to 30 minutes. Filter the suspension, remove most of the acid and anhydride in vacuo, and partition the residue between ether and 10% aqueous sodium bicarbonate. Dry the neutral ether layer over magnesium sulfate, filter, remove the solvent and obtain the product of this example.

EXAMPLE 18

2-Chloro-4'-nitro-3'-trifluoromethylisobutyranilide

Stir a mixture of 33.2 g. (0.11 mole) of 2-chloro-N-(4-nitro-3-trifluoromethylphenyl)-isobutyrchloroimidate in 200 ml. of 0.5 N aqueous sodium hydroxide at room temperature until the mixture is neutral (as indicated by appropriate pH paper) and then filter off the product of this example.

2-Hydroxy-4'-chloro-3'-trifluoromethylisobutyranilide is prepared by refluxing 0.2 moles of 4-chloro-3-trifluoromethylaniline and 14.3 gms. of 2,2,5,5-tetramethyl-4-oxazolidone in 250 ml. of ethanol for 24 hrs., removing the solvent and triturating the residue with benzene/petroleum ether and isolated by filtration.

The tangible embodiment of the compositions of this invention possess the inherent general physical properties of being colorless or pale yellow and crystalline, exhibiting moderate melting points, and are substantially insoluble in water and hydrocarbons and the like.

The tangible embodiments of the compounds represented by formula I possess the inherent applied-use characteristic of exerting an anti-androgenic response when administered within the dose range of about 0.1 mg. to about 50 mg. per kg. of body weight per day and thus are useful in treating, alleviating and/or palliation of androgen-caused and/or androgen-dependent conditions such as prostatic hypertrophy, the Stein-Leventhal syndrome, idiopathic hirsutism, acne, mammary carcinoma and the like. In addition to the aforementioned applied use as therapeutic agents, the compounds of this invention (I) have an applied veterinary use.

In their veterinary application, the administration of these compounds is useful in reducing androgen-casued odor normally associated with the meat of male animal species, in controlling and/or elminating the birth of normal males, and for reducing the aggressive tendencies of the male animal species; these actions of course being dependent largely by the time of administration of the anti-androgenic agent.

In those species afflicted with prostatic hypertrophy the frequency of the hypertrophic condition seems to increase with increasing age and thus represents a serious problem, even among older canine household pets. In general, hormone therapy, such as for example, administration of estrogenic substances, has not proved to be a particularly desirable treatment, not only because of the undesirable side effects due to the inherent properties of the estrogens, but also because such agents have not proved to be fully efficacious in providing meaningful remissions and cures. Surgical ablation, even though effective, is also not particularly desirable for in addition to the expected 2–3% mortality rate, many patients experience such non-fatal complications such as epididymitis, pneumonia, pyelonephritis, secondary resection, etc. Thus, the chemotherapeutic treatment of prostatic hypertrophy with concomitant absence of side effects induced by the anti-androgenic agent has been a goal long sought.

It has been determined by standard laboratory test procedures that the compounds of this invention produce marked remissions in cases of prostatic hyperplasia without the undesirable effects elicited upon the administration of estrogens or complications inherent in any surgical procedures. Usually, depending upon the severity of the condition, a satisfactory therapeutic response is achieved in those mammal species having an adult body weight of approximately 70 kg. when 1 to 4 dosage units of the hereinafter described pharmaceutical formulations are administered to the species. Thus, a suitable dosage range for a 70 kilogram mammal is in the range of about 25 mg. to 500 mg. of the preferred active ingredients per day until symptomatic relief is obtained as ascertained by the attending diagnostician.

As stated above, the compounds of this invention may be used as chemical castrating agents in the veterinary field.

It has been long known that male bovine and porcine species are not particularly suitable as meat producing animals. It is also known that the male animal grows at a faster rate, usually weighs more and produces a leaner carcass than does the corresponding female species. One attempt at converting the male into a more suitable commercial meat source has been by surgical castration (i.e., removal of the androgen source). However, this method has not been completely satisfactory for it involves a time-consuming process and often times leads to post-surgical problems such as infections.

Quite unexpectedly, it has been found that upon administration of a therapeutically effective quantity of the compounds of this invention substantially the same results sought by surgical castration are obtained. Ergo these agents are referred to as chemical castrating agents. Thus, the aforementioned undesirable meat-growth characteristics are obviated and thus a more suitable animal species is available for commercial use. In addition to the enhanced growth characteristics, it is also found that these chemically castrated male animal species are devoid of the noxious odor usually associated with such animals. This noxious odor is particularly manifested by the pig species wherein the meat of the males, upon cooking, emits the well-known and quite repugnant "boar-odor" rendering the meat product unpalatable. The meat derived from the chemically castrated animal is not so tainted and indeed, it is quite palatable. This discovery is of great economic importance, in that the previously commercially unsuitable meat products were the source of a great economic waste. Although the application of this discovery is particularly suitable for the treatment of pigs, it also may be used for treating other animal species such as cattle, horses, sheep, oxen, hogs, goats and the like. Indeed, the compounds of this invention may also be used for chemical castration for eliciting the desired effect in such avian species as drakes, geese, roosters, turkeys, and the like; such application, of course, only being during the development of the secondary sex characteristics.

In another of its veterinary uses these anti-androgens when used as chemical castrating agents have the effect of reducing the aggressive tendencies normally associated with the male animal species. This aspect is particularly useful for the treatment of valuable zoological species such as lions, tigers, elephants.

As chemical castrating agents, these compounds are also useful as pest control agents where the effect is to decrease the population of the undesired species by ineffectuating the male species thereof.

The hereinabove described chemical castration process may be effected in two manners. In mammals, the desired effect is obtained by administering a therapeutically effective quantity of the compounds of formula I to the gravid mammal shortly before and/or during the period of fetal genital formation. The results of this administration is that the litter produced will be devoid of all normal male species and will consist solely of females and "pseudo hermaphrodites," the latter having some female anatomical structures (e.g. a clitoral-like penis and a vaginal tract). In one test, 2-hydroxy-4'-nitro-3'-trifluoromethylisobutyranilide is administered to pregnant rats during the 16th to 19th day of gestation, a period during which the fetal genitalia develop, thereby producing a litter containing only females and pseudohermaphrodites. The time of gestation during which the fetal genitals develop is documented for many animal species and where such information is not available in the literature, the period may be determined by methods well known to the art.

The second process for chemically castrating in animal species comprises the administration of a therapeutically effective quantity of the compounds (I) to a male animal species shortly before and/or during the development of its secondary sex characteristics so as to elicit an anti-androgenic effect during and after said period. The animal so treated will be suitable for use as a commercial source of meat. The other manifestations of the chemical castration are also known in these animals.

In its process aspect then, the instant invention may be described as residing in the concept of exerting an anti-androgenic effect which comprises administering a therapeutic formulation containing as the essential ingredient, a member of the group of compounds of the general structural formula:

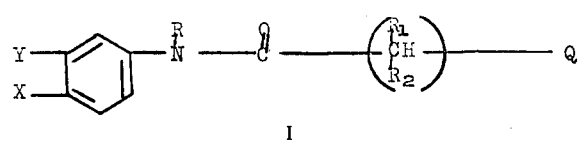

I wherein X is a member of the group consisting of nitro, trifluoromethyl, chloro, bromo and iodo; Y is a member of the group consisting of hydrogen, halogen, nitro, amino, lower alkylamino, lower dialkylamino, lower alkyl, lower alkoxy, lower alkanoyl, poly- fluoroloweralkoxy, polyfluoroloweralkyl, trifluoromethylthio and

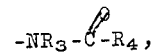

$NR_3SO_2R_4$; R is hydrogen or an alkyl having less than five carbon atoms; $R_1$ and $R_2$ each are straight or branched alkyl radicals having up to eight carbon atoms, cyclopropyl, or cyclobutyl, and together with the carbon atom to which they are attached, $R_1$ and $R_2$ form cyclopropyl and cyclobutyl, $R_3$ is hydrogen or lower alkyl and $R_4$ is hydrogen, loweralkyl, arylalkyl or aryl and Q is a member of the group consisting of halogen, hydroxy, lower alkoxy, lower arylalkoxy, lower alkanoyloxy and lower arylalkanoyloxy.

As is true in most classes of compounds suitable for any given purposes, certain members have been found to be more desirable than others of that class. In the instant invention it is found that the preferred compounds are those compounds of formula I wherein R represents H, each of $R_1$ and $R_2$ are methyl, ethyl or isopropyl and Q is hydroxy, bromo, iodo, chloro and methoxy, acetoxy, valeryloxy, and particularly effective X and Y combinations for the foregoing are those wherein X is nitro, iodo, bromo or chloro with Y being trifluoromethyl or wherein X and Y are similar radicals. Specific compounds of particular interest are 2-hydroxy-4'-nitro-3'-trifluoromethylcycloproypl-carbanilide, 2-hydroxy-4'-nitro-3'-trifluoromethylisobutyranilide, 2-hydroxy-4'-iodo-3'-trifluoromethylisobutyranilide, 2,3-dimethyl-2-hydroxy-4'-nitro-3'-trifluoromethylbutyranilide, 2-hydroxy-4'-nitro-3'-trifluoromethylisovaleranilide, 4'-bromo-2-hydroxy-3'-trifluoromethylisobutyranilide, 2-hydroxy-4'-nitroisobutyranilide, 4'-chloro-2-hydroxy-3'-trifluoromethylisobutyranilide, 3'-bromo-2-hydroxy-4'-nitroisobutyranilide, 3'-chloro-2-hydroxy-4 '-nitroisobutyranilide, 2-chloro-4'-nitro-3'-trifluoromethyl-cyclopropylcarbanilide, 2-chloro-4'-nitro-3'-iodo-3'-trifluoromethylbutyranilide, 2-chloro-4'-nitro-3'-trifluoromethylcyclopropylcarbanilide, 2-chloro-4'-nitro-3'-trifluoromethyl-isobutyranilide, 2-chloro-2,3-dimethyl-4'-iodo-3'-trifluoromethylbutyranilide,2-chloro-4'-nitro-3'-trifluoromethylisovaleranilide, 4'-bromo-2-chloro-3'-trifluoromethylisobutyranilide, 2-chloro-4'-nitroisobutyranilide, 2,4'-dichloro-3'-trifluoromethylisobutyranilide, 3'-bromo-2-chloro-4'-nitroisobutyranilide, 2,3'-cidhloro--dichloro-'-nitroisobutyranilide, 4'-Nitro-3'-Trifluoromethyl-2-valeryloxyisbutyranilide, respectively.

It is recognized that certain anilides have been known to exert untoward side effects in their use as chemotherapeutic agents. For example, it is known that at certain doses certain anilides will cause methemoglobin formation and sulfhemoglobinemia and appropriate laboratory tests are readily available to the art to determine the dosage at which these untoward side effects will be manifest (Goodman and Gilman, 1955, MacMillan Company). It is a discovery connected with the compounds of this invention that the untoward manifestations effects do not occur at the effective dosage range wherein the compounds exert their beneficial anti-androgenic effects and thus these compounds are extremely useful for the purposes herein described. In the determination of the dosage range at which the untoward side effects will begin to appear, standard laboratory procedures may be applied. In general, the untoward side effects, if caused by the preferred compounds of this invention are seen at doses well above the 50 mg./kg. of body weight. However, in all instances there is a sufficient difference between the therapeutic dosage and the dosage wherein toxic manifestiations are elicited and thus the compounds of this invention possess a suitable therapeutic index.

The active substituted anilides (I) of this invention can be administered orally in the form of tablets, capsules, elixirs, and the like or may be administered by parenteral injection. In tablet form they are compounded with an inert pharmaceutical carrier which may contain a suitable binder such as, for example, gums, starches, and sugars. They may also be incorporated into gelatin capsules or formulated into elixirs which have the advantage of being susceptible to manipulations in flavor by the addition of standard natural or synthetic flavoring agents. Highly satisfactory administration may also be achieved in the form of aqueous parenteral suspensions. The compounds of this invention effectively elicit an anti-androgenic effect at about 1 to about 50 mg./kg. of body weight on a daily basis. Preferably, these formulations are so proportioned as to afford a unit dosage of from about 1 to about 100 mg. of active substituted-anilide. Particularly, preferred are unit dosages ranging from about 5 to about 25 mg. Preferably, the compounds are administered orally.

Furthermore, the therapeutically active ingredient may be admixed with the food of the species to which the administration is desired, thereby obtaining a therapeutically efficacious dose level.

Representative embodiments of the formulations containing the compositions of this invention are as follows:

TABLET FORMULATIONS

| Formula A (5 mg.) | Milligrams per Tablet |
| --- | --- |
| 2-bromo-4'-nitro-3'-tri-fluoromethylisobutyranilide | 5.0 |
| Starch, Food Grade | 5.0 |
| Lactose, U.S.P. (Spray Dried) | 89.5 |
| Magnesium Stearate, U.S.P. | 0.5 |
| | 100.0 |

| Formula B (25 mg.) | Milligrams per Tablet |
| --- | --- |
| 2-hydroxy-4'-nitro-3'-tri-fluoromethylisobutyranilide | 25.0 |
| Starch, Food Grade | 10.0 |
| Lactose, U.S.P. (Spray Dried) | 164.0 |
| Magnesium Stearate, U.S.P. | 1.0 |
| | 200.0 |

Pass the 2-hydroxy-4'-nitro-3'-trifluoromethylisobutyranilide through a high speed mill equipped with a 100 to 150 mesh screen. Blend the milled 2-hydroxy-4'-nitro-3'-trifluoromethylisobutyranilide with the starch in a suitable mixing vessel. Add an equal weight of the spray dried lactose to the blend and mix until uniform. Combine the resultant blend with the remainder of the spray dried lactose and mix until uniform. Charge the magnesium stearate with a portion of the active tablet mix and blend. Blend the magnesium stearate mix with the remaining active tablet base. Continue mixing until uniform. Compress to target weight (100.0 mg. for 5 mg. tablet and 200.0 mg. for 25 mg. tablet).

CAPSULE FORMULATIONS

| Formula | Milligrams per Capsule |
| --- | --- |
| 2-bromo-4'-nitro-3'-tri-fluoromethylisobutyranilide | 5.0 |
| Lactose, U.S.P. (Spray Dried) | 292.0 |
| Magnesium Stearate, U.S.P. | 3.0 |
| | 300.0 |

Blend ingredients until uniformly mixed. Fill into hard gelatin capsule.

PARENTERAL SUSPENSION

| Formula A (5 mg.) | Milligrams per Milliliter |
| --- | --- |
| 2-bromo-4'-nitro-3'-tri-fluoromethylisobutyranilide | 5.00 |
| Methyl Cellulose 15 cps. U.S.P. | 0.05 |
| Sodium Citrate, Dihydrate | 6.00 |
| Benzyl Alcohol, NF | 9.00 |
| Methylparaben, U.S.P. | 1.80 |
| Propylparaben, U.S.P. | 0.20 |
| Water for Injection, U.S.P. | 1.00 |
| 2-Bromo-4'-nitro-3'-trifluoromethylisobutyranilide | 25.00 |
| Methyl Cellulose 15 cps. U.S.P. | 0.25 |
| Sodium Citrate, Dihydrate | 30.00 |
| Benzyl Alcohol, NF | 9.00 |
| Methylparaben, U.S.P. | 1.80 |
| Propylparaben, U.S.P. | 0.20 |
| Water for Injection, U.S.P. q.s. a.d. | 1.00 |

Charge 45 liters of water for injection into a suitable stainless steel vessel and heat to 85°–90°C. With vigorous agitation, slowly sprinkle the methyl cellulose into the hot water (5 mg. for formula A or 25 for formula B). Agitate until the methyl cellulose is thoroughly dispersed and wetted. Add approximately, 30 liters of cold (0°–5°C) water for injection. Cool the entire mixture to 8°C. Dissolve the sodium citrate (600 gm. of formula A or 3,000 gm. for formula B) in enough water for injection to make 5 liters of solution. Slowly and with agitation add this solution to the cooled methyl cellulose solution. Dissolve the parabens (180 gm. of methyl and 20 gm. of propyl) in 900 gm. of benzyl alcohol which has been heated to 30°C. Charge this solution to the chilled methyl cellulose solution. Bring the resulting solution to 90 liters with water for injection and agitate until uniform. In a sterile area, pass the batch through a sterile filter. Aseptically transfer about 3.5 liters of the sterile methyl cellulose solution to a separate container reserving the remainder of the batch in a sterile stainless steel mixing tank. Slurry the 2-bromo-4'-nitro-3'-trifluoromethylisobutyranilide in sterile colloid mill with about 2 liters of the separated methyl cellulose solution and add the slurry to the solution in the mixing tank. Rinse the slurry container and the mill with the remaining 1.5 liters of reserved methyl cellulose solution and add the rinse to the mixing tank. Rinse the slurry container and mill with 2 liters of water for injection and add the rinse to the mixing tank. Adjust the volume in the mixing tank to 100 liters with water for injection and agitate until uniform. The batch affords 100 liters of sterile suspension having the proportions of formula A or formula B.

I claim:
1. 2-Hydroxy-4'-nitro-3'-trifluoromethylisobutyranilide.
2. 4'-nitro-3'-trifluoromethyl-2-valeryloxyisobutyranilide.

* * * * *